United States Patent
Kumar et al.

(10) Patent No.: US 11,720,478 B2
(45) Date of Patent: Aug. 8, 2023

(54) SYSTEM AND METHOD FOR AUTOMATED GENERATION OF TEST CASES AND TEST DATA FOR VALIDATING A SOFTWARE APPLICATION

(71) Applicants: Rajat Kumar, Mountain View, CA (US); Sugandha Kapoor, Mountain View, CA (US)

(72) Inventors: Rajat Kumar, Mountain View, CA (US); Sugandha Kapoor, Mountain View, CA (US)

(*) Notice: Subject to any disclaimer, the term of this patent is extended or adjusted under 35 U.S.C. 154(b) by 21 days.

(21) Appl. No.: 17/462,512

(22) Filed: Aug. 31, 2021

(65) Prior Publication Data

US 2022/0091968 A1    Mar. 24, 2022

Related U.S. Application Data

(60) Provisional application No. 63/073,095, filed on Sep. 1, 2020.

(51) Int. Cl.
| | |
|---|---|
| *G06F 11/36* | (2006.01) |
| *G06F 8/10* | (2018.01) |
| *G06N 20/00* | (2019.01) |

(52) U.S. Cl.
CPC ............ *G06F 11/3684* (2013.01); *G06F 8/10* (2013.01); *G06F 11/368* (2013.01); *G06F 11/3688* (2013.01); *G06F 11/3692* (2013.01); *G06N 20/00* (2019.01)

(58) Field of Classification Search
CPC ...... G06F 11/3684; G06F 8/10; G06F 11/368; G06F 11/3688; G06F 11/3692; G06N 20/00
See application file for complete search history.

(56) References Cited

U.S. PATENT DOCUMENTS

| | | | |
|---|---|---|---|
| 2017/0277621 A1* | 9/2017 | Shanley | G06F 3/0484 |
| 2019/0196949 A1* | 6/2019 | Venkataraman | G06F 11/008 |
| 2019/0213115 A1* | 7/2019 | Takawale | G06F 11/3692 |
| 2019/0278699 A1* | 9/2019 | Sharma | G06F 9/451 |
| 2020/0401382 A1* | 12/2020 | Briggs | G06N 5/04 |

* cited by examiner

*Primary Examiner* — Ziaul A Chowdhury
(74) *Attorney, Agent, or Firm* — Barry Choobin; Patent 360

(57) ABSTRACT

A system and method for automated validation testing of software applications during software development and after development stages of the product life cycle. The disclosed system uses pre-trained machine learning models and image recognition algorithms to generate test cases and test data from text and images in product specification documents of the software applications.

12 Claims, 21 Drawing Sheets

| Test Steps for Cancel Button Behavior |
|---|
| On Create Task Screen, enter a Title |
| Enter a due date |
| Click on the Cancel button |
| It should navigate to the Task Viewer screen |

| Create Task Screen | | | |
|---|---|---|---|
| ID | Entity | Entity Type | Properties |
| 1 | Create Task | Text | <ul><li>Data Type: String</li><li>Coordinates for: left, top, right, bottom, x, y, width, height (Rectangular boundary)</li></ul> |
| 2 | Title | Input Text Box | <ul><li>Placeholder: "Enter a title for the task"</li><li>Data Type: String</li><li>Mandatory: True</li><li>Coordinates for: left, top, right, bottom, x, y, width, height (Rectangular boundary)</li></ul> |
| 3 | Due Date | Input Text Box | <ul><li>Data Type: Date</li><li>Mandatory: False</li><li>Format: "MM/DD/YYYY"</li><li>Icon: Calendar</li><li>Coordinates for: left, top, right, bottom, x, y, width, height (Rectangular boundary)</li></ul> |
| 4 | Save | Button | <ul><li>State: enabled</li><li>Highlighted: false</li><li>Coordinates for: left, top, right, bottom, x, y, width, height (Rectangular boundary)</li></ul> |
| 5 | Cancel | Button | <ul><li>State: enabled</li><li>Highlighted: false</li><li>Coordinates for: left, top, right, bottom, x, y, width, height (Rectangular boundary)</li></ul> |

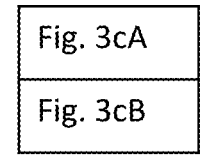

| ID | Statement | Intent Type | Entity | Role | Properties |
|---|---|---|---|---|---|
| 1 | A task has a Title and a Due Date. | Requirement | task | Primary Context | • Attribute: Title<br>• Attribute: Due Date |
| 2 | user can give a title | Action | Title | Keyboard Type | • UI Element: Input Text Box<br>• Identifier: Title<br>• IdentifierValue: <data><br>• Screen: Create Task Screen |
| 3 | and a due date | Action | Due Date | Keyboard Type | • UI Element: Input Text Box<br>• Identifier: Due Date<br>• IdentifierValue: <data><br>• Screen: Create Task Screen |
| 4 | Clicking on the Save button | Action | Save | Mouse Click | • UI Element: Button<br>• Identifier: Save<br>• Screen: Create Task Screen |
| 5 | take the user to the Task Viewer Screen | Screen | Task Viewer Screen | Navigation | • UI Element: Screen<br>• Identifier: Task Viewer Screen<br>• Screen: Task Viewer Screen<br>• Parent Actions: #2, #3, #4 |

Fig. 3cA

| 6 | user can see the created task | Action | Task | Verify | <ul><li>UI Element: Text</li><li>Identifiers: Task Title, Task Due Date</li><li>Screen: Task Viewer Screen</li><li>Parent Actions: #2 AND #3 AND #4 AND #5</li></ul> |
|---|---|---|---|---|---|
| 7 | user does not give a title | Action | Title | Keyboard Type | <ul><li>UI Element: Input Text Box</li><li>Identifier: Title</li><li>IdentifierValue: ""</li><li>Screen: Create Task Screen</li></ul> |
| 8 | clicks on the save button | Action | Save | Mouse Click | <ul><li>UI Element: Button</li><li>Identifier: Save</li><li>Screen: Create Task Screen</li></ul> |
| 9 | will see an error message "Give a Title for the task" | Action | Error Message | Verify | <ul><li>UI Element: Text</li><li>Identifier: "Give a Title for the task"</li><li>Screen: Create Task Screen</li><li>Parent Actions: #7 AND #8</li></ul> |

| Fig. 3dA |
|---|
| Fig. 3dB |

| Test Case: Positive Test Case - 1 | | | | |
|---|---|---|---|---|
| Step | Step Description | Action | Action Parameters | |
| 1 | Validate Initial State | Verify | Title Input Box | - Placeholder text exists<br>- Value is empty |
| | | | Due Date Input Box | - Placeholder text exists<br>- Value is empty |
| | | | Cancel Button | - Button exists |
| | | | Save Button | - Button exists |
| 2 | Type <titleText> in input box with identifier "Title" | Keyboard Type | Title Input Box | - Data: <titleText> |
| 3 | Type <dueDate> in input box with identifier "Due Date" | Keyboard Type | Due Date Input Box | - Data: <dueDate><br>- Data format: MM/DD/YYYY |
| 4 | Click Save Button | Mouse Click | Save Button | |
| 5 | Wait for Navigation | Navigation | | |
| 6 | Verify <titleText> and <dueDate> Text | Verify | Text | <titleText> |
| | | | Text | <dueDate> |

Fig. 3dA

| Test Case: Negative Test Case - 1 | | | | |
|---|---|---|---|---|
| Step | Step Description | Action | Action Parameters | |
| 1 | Validate Initial State | Verify | Title Input Box | - Placeholder text exists<br>- Value is empty |
| | | | Due Date Input Box | - Placeholder text exists<br>- Value is empty |
| | | | Cancel Button | - Button exists |
| | | | Save Button | - Button exists |
| 2 | Type <dueDate> in input box with identifier "Due Date" | Keyboard Type | Due Date Input Box | - Data: <dueDate><br>- Data format: MM/DD/YYYY |
| 3 | Click Save Button | Mouse Click | Save Button | |
| 4 | Verify Error Text | Verify | Text | "Give a Title for the task" |

| Fig. 3eA |
|---|
| Fig. 3eB |

| Positive Test Data | | | | |
|---|---|---|---|---|
| ID | Entity | Attribute | Value | Description |
| 1 | Task | Title | "Task Title One" | • Valid Text<br>• Length > 0<br>• Mandatory |
| | | Due Date | "02/23/2021" | • Valid Date<br>• Format MM/DD/YYYY<br>• Non Mandatory |
| 2 | Task | Title | "Task Title Two" | • Valid Text<br>• Length > 0<br>• Mandatory |
| | | Due Date | "" | • Valid Date<br>• Length = 0<br>• Non Mandatory |

| Negative Test Data | | | | |
|---|---|---|---|---|
| ID | Entity | Attribute | Value | Description |
| 1 | Task | Title | "" | • Invalid Text<br>• Length = 0<br>• Mandatory |
| | | Due Date | "02/23/2021" | • Valid Date<br>• Format MM/DD/YYYY<br>• Non Mandatory |
| 2 | Task | Title | "" | • Invalid Text<br>• Length = 0<br>• Mandatory |

Fig. 3eA

| | | Due Date | " " | • Valid Date<br>• Length = 0<br>• Non Mandatory |
|---|---|---|---|---|
| 3 | Task | Title | "Task Title Three" | • Valid Text<br>• Length > 0<br>• Mandatory |
| | | Due Date | "23/01/1900" | • Invalid Date<br>• Format DD/MM/YYYY<br>• Non Mandatory |
| 4 | Task | Title | "Task Title Four" | • Valid Text<br>• Length > 0<br>• Mandatory |
| | | Due Date | "1900/12/31" | • Invalid Date<br>• Format YYYY/MM/DD<br>• Non Mandatory |

Fig. 3eB

```
async function runTestWithPositiveDataSeqId1() {
  await testFlow1({
    titleText: 'Task Title One',
    dueDate: '02/23/2021',
  });
} async function testFlow1({ titleText, dueDate }) {
  // Enter text for Task.title
  await page.fill('text=Title', `${titleText}`);
  // Enter text for Task.dueDate
  await page.fill('text=Due Date', `${dueDate}`);
  // Click Save
  await page.click('text=Save');
  // wait for page to load
  await page.wait({ waitUntil: 'networkidle' });
  // assert we see title and dueDate text
  const titleElement = await page.waitForSelector(`text=${titleText}`);
  const dueDateElement = await page.waitForSelector(`text=${dueDate}`);
  assert(titleElement !== null, `Title ${titleText} does not exist`);
  assert(dueDateElement !== null, `Due Date ${dueDate} does not exist`);
}
```

Fig. 3g

Create a Task

A task has a Title, Due Date, and an Owner.

On Create Task Screen, the user can give a title a due date and click on the Create button. Clicking on the create button will take the user to the Task Viewer Screen where the user can see the created task.

If the user does not give a title and clicks on the create button, the user will see an error message "Give a Title for the task".

| Fig. 4dA |
|---|
| Fig. 4dB |

| Positive Test Data | | | | |
|---|---|---|---|---|
| ID | Entity | Attribute | Value | Description |
| 1 | Task | Title | "Task Title One" | • Valid Text<br>• Length > 0<br>• Mandatory |
| | | Due Date | "02/23/2021" | • Valid Date<br>• Format: MM/DD/YYYY<br>• Non Mandatory |
| | | Owner | "User A" | • Valid Text<br>• Length > 0<br>• Mandatory |
| 2 | Task | Title | "Task Title Two" | • Valid Text<br>• Length > 0<br>• Mandatory |
| | | Due Date | "" | • Valid Date<br>• Length = 0<br>• Non Mandatory |
| | | Owner | "User B" | • Valid Text<br>• Length > 0<br>• Mandatory |

Fig. 4dA

| Negative Test Data | | | | |
|---|---|---|---|---|
| ID | Entity | Attribute | Value | Description |
| 1 | Task | Title | "" | • Invalid Text<br>• Length = 0<br>• Mandatory |
| | | Due Date | "02/23/2021" | • Valid Date<br>• Format: MM/DD/YYYY<br>• Non Mandatory |
| | | Owner | "User C" | • Valid Text<br>• Length > 0<br>• Mandatory |
| 2 | Task | Title | "" | • Invalid Text<br>• Length = 0<br>• Mandatory |
| | | Due Date | "" | • Valid Date<br>• Length = 0<br>• Non Mandatory |
| | | Owner | "User D" | • Valid Text<br>• Length > 0<br>• Mandatory |
| 3 | Task | Title | "Task Title Three" | • Valid Text<br>• Length > 0<br>• Mandatory |
| | | Due Date | "23/01/1900" | • Invalid Date<br>• Format: DD/MM/YYYY<br>• Non Mandatory |
| | | Owner | "User E" | • Valid Text<br>• Length > 0<br>• Mandatory |
| 4 | Task | Title | "Task Title Four" | • Valid Text<br>• Length > 0<br>• Mandatory |
| | | Due Date | "1900/12/31" | • Invalid Date<br>• Format: YYYY/MM/DD<br>• Non Mandatory |
| | | Owner | "User F" | • Valid Text<br>• Length > 0<br>• Mandatory |
| 5 | Task | Title | "Task Title Five" | • Valid Text<br>• Length > 0<br>• Mandatory |
| | | Due Date | "02/23/2021" | • Valid Date<br>• Format: MM/DD/YYYY<br>• Non Mandatory |
| | | Owner | "" | • Invalid Text<br>• Length = 0<br>• Mandatory |

Fig. 4dB

| Test Case: Create Task 1 | | | | |
|---|---|---|---|---|
| Step | Step Description | Action | Action Parameters | |
| 1 | Validate Initial State | Verify | Title Input Box | - Placeholder text exists<br>- Value is empty |
| | | | Due Date Input Box | - Placeholder text exists<br>- Value is empty |
| | | | Owner Input Box | - Placeholder text exists<br>- Value is empty |
| | | | Cancel Button | - Button exists |
| | | | Create Button | - Button exists |
| 2 | Type <titleText> in input box with identifier "Title" | Keyboard Type | Title Input Box | - Data: <titleText> |
| 3 | Type <dueDate> in input box with identifier "Due Date" | Keyboard Type | Due Date Input Box | - Data: <dueDate><br>- Data format: MM/DD/YYYY |
| 4 | Type <owner> in input box with identifier "Owner" | Keyboard Type | Owner Input Box | - Data: <owner> |
| 5 | Click Create Button | Mouse Click | Create Button | |
| 6 | Wait for Navigation | Navigation | | |
| 7 | Verify <titleText>, <dueDate> Text and <owner> Text | Verify | Text | <titleText> |
| | | | Text | <dueDate> |
| | | | Text | <owner> |

Fig. 4e

SYSTEM AND METHOD FOR AUTOMATED GENERATION OF TEST CASES AND TEST DATA FOR VALIDATING A SOFTWARE APPLICATION

CROSS-REFERENCE TO RELATED APPLICATIONS

This application claims priority to the U.S. provisional patent application Ser. No. 63/073,095, filed on Sep. 1, 2020, which is incorporated herein by reference in its entirety.

FIELD OF INVENTION

The present invention relates to automated validation testing of a software application during the development process or at the end of the development process, and more particularly the present invention relates to the use of machine learning to generate test cases and test data from product specification for the validation testing of the software application.

BACKGROUND

A product specification is a detailed document that outlines the key requirements for building a new feature in an existing software application, modify or upgrade the software application, or creating a new software application. The product specification includes detailed information that provides software development teams the information they need to build software application. A typical software product specification can include details about various features, interfaces, and product requirements. The product specification is generally prepared by a business team and the software development team uses the product specification prepared by the business team to develop the software application and its features. A quality assurance (QA) team is responsible for evaluating the software application based on the product specification. The QA team can generate test cases from the product specification to test whether the software application meets its intended objective.

In software testing, test procedures are used to automate the testing of the software application. Test procedures are written in the form of program source code, which when executed, compare the actual outcomes of the test with the intended outcome of the test. Writing of the test procedures takes significant manual effort and the test engineer or automation engineer should have software coding ability. In addition to this, test procedures for testing Graphical User Interface (GUI) can be written only once the software application with a GUI exists. This is because existing testing tools rely on values from GUI object maps to match the object properties and identify the relevant GUI objects to perform testing operations. GUI object maps are mapping between various objects in the GUI and a set of properties that can be used to identify objects on the screen. This approach creates a dependency between the test automation and the development of the software. For each version of the software application, the test engineer has to wait for the development team to build the GUI before they can write automated tests.

Almost all test automation of software applications involves using test data. The assertions of values in the test automation are based on the test data used during the test execution. It is often laborious and error-prone to build test data for software applications that include GUIs to test all possible outcomes in the GUI. Moreover, minor changes in the product specification may lead to major changes in the automated testing procedures. For each version of the software application, any changes to the software application need to be tracked and the test procedures, test data, and GUI object maps often need to be updated before subsequent testing. The time required for this tracking and modifying of test procedures, test data, and GUI object maps often limits the amount of testing that can be performed, which may prevent software teams from systematically identifying and correcting errors in the software products. Similar issues occur when documenting test procedures and test results. In particular, many existing techniques require testers/QA engineers to maintain a log of the test procedures and test results. Unfortunately, the need to expend time to maintain such documentation often limits the amount of testing that can be performed. All of these issues can adversely affect software development costs, product reliability, and ultimately customer satisfaction.

Thus, a long and unsolved need is there for a system and method that overcomes the aforementioned problems in the validation testing of software applications both during the development phase and post-development.

Hereinafter the phrases "validation testing", "validation", "testing", and "software testing" are interchangeably used and refer to the evaluation of a software application during the development process or at the end of the development process.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a system and method for automated generation of test cases and test data for validation testing of software applications.

It is another object of the present invention that automated validation testing can be done both during software application development and after completion of the development process.

It is still another object of the present invention that the documentation and reporting of the testing can be automated.

It is yet another object of the present invention that the disclosed method is cost-effective.

It is a further object of the present invention that the progress of software development can be easily tracked.

In one aspect, disclosed is a system and method for generating test cases and test data for validation testing of software application, execution of the validation testing, and recording and reporting of the results of the software testing. The disclosed system can generate test cases and test data using the machine learning models and natural language processing from the specification data of the software application.

In one aspect, the changes in the product specification can also be tracked and the test cases can be modified automatically by the disclosed system and method, saving time and cost. The automated test procedures can be created and executed before the completion of the software application development. The progress of the software development including different features can be tracked and validated to ensure quality, performance, readiness to ship to the customers. Since the test cases and test data can be generated before the product development, the QA team can also validate the test cases, test steps and test data for both automated and manual testing earlier in the product development life cycle.

In one aspect, the disclosed system can generate automated test procedures with test cases. The system can analyze the different product specification documents to identify the functionality, one or more screens, one or more fields on these screens, and automatically generates and executes the test procedures using the test data, wherein the tests can be performed to validate the features and the visual appearance of the software application as detailed in the product specifications document.

In one aspect, the disclosed system and method can generate and execute automated tests from the product specification documents and test steps written in natural language. The disclosed system can be a single data processing system or distributed data processing system. The UIs specification can be processed by machine learning models and image recognition algorithms.

In one aspect, the execution results of the validation tests can be analyzed by the disclosed system and method. The object on the screen can be identified using image processing and the current screen can be compared with the mocked-up screen.

In one aspect, any changes in the product specification during product development or life cycle of a software application can be tracked and the test data can be generated for the modified product specification.

These and other objects and advantages of the embodiments herein and the summary will become readily apparent from the following detailed description taken in conjunction with the accompanying drawings.

BRIEF DESCRIPTION OF THE DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

FIG. 3b shows an exemplary embodiment of data generated by Image Processing ML model 400 of FIG. 3, according to an exemplary embodiment of the present invention.

FIG. 3c which is a combination of FIG. 3cA and FIG. 3cB shows an exemplary embodiment of the data generated by text processing ML model 500 in FIG. 3, according to an exemplary embodiment of the present invention.

FIG. 3d which is a combination of FIG. 3dA and FIG. 3dB shows an example of test cases 700 in FIG. 3, according to an exemplary embodiment of the present invention.

FIG. 3e which is a combination of FIG. 3eA and FIG. 3eB shows an example of test data 750 generated by the test data ML model 650 of FIG. 3, according to an exemplary embodiment of the present invention.

FIG. 3g shows an example of source code that might be generated as part of automated tests with test data 800 shown in FIG. 3 for FIG. 3d (positive test case), according to an exemplary embodiment of the present invention.

FIG. 4b shows the example feature specification of FIG. 1 with a modification shown by underlining.

FIG. 4d which is a combination of FIG. 4dA and FIG. 4dB shows an example of updated test data generated by Test Data ML Model 650 in FIG. 4, according to an exemplary embodiment of the present invention.

FIG. 4e shows an example of an updated test case generated by Test case ML Model 600 in FIG. 4, according to an exemplary embodiment of the present invention.

DETAILED DESCRIPTION

Figure 1:
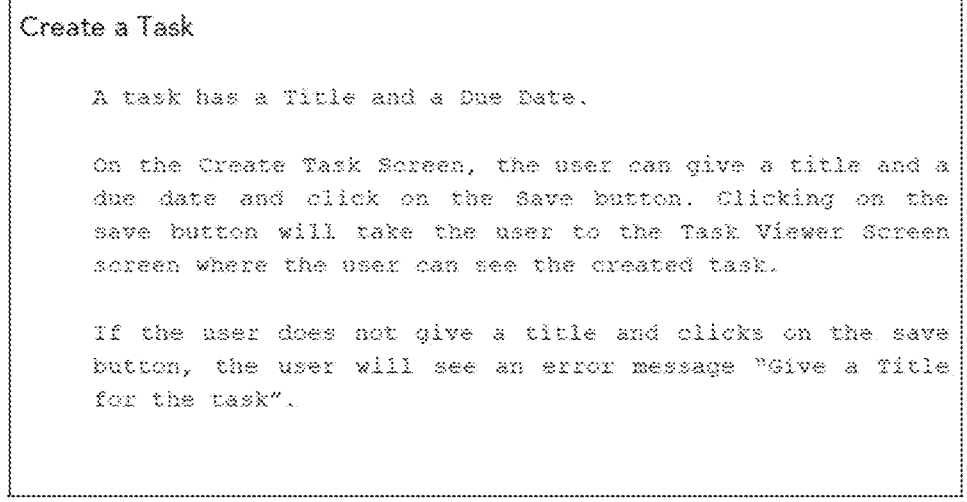
FIG. 1 shows an example feature specification from a product specification document of a software application that can be processed by the disclosed system for generating test cases and test data, according to an exemplary embodiment of the present invention.

The accompanying figures, which are incorporated herein, form part of the specification and illustrate embodiments of the present invention. Together with the description, the figures further explain the principles of the present invention and to enable a person skilled in the relevant arts to make and use the invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is a system and method to check whether the actual software application product matches the expected requirements detailed in a product specification document of the software application. Hereinafter the phrase "software application" is interchangeably used with "software", "software application product", and "product". The disclosed system can help to ensure that the software product can be delivered error-free to the customer. The system can identify errors, gaps, or missing features in contrast to actual requirements detailed in the product specification. The product specification can be analyzed by the disclosed system to identify test cases and thereafter authoring the test steps for manual or automated software testing. The test data herein refers to data identified by the disclosed system that can be used in the tests and can be entered by the test steps for testing and validating the software application. The disclosed system can generate both the test cases and the test data for the validation testing of the software application. The test data can include an exhaustive combination of the supported and unsupported values for rigorous testing of the software application. The test cases can be both positive test cases and negative test cases. Positive test cases can be used for any positive path testing to validate the normal outcome of a function performed by the software application. Such test cases need positive test data i.e., when test data is provided, the software should produce expected results. The test cases can also be designed for error or negative testing which helps discover how the application performs when put in abnormal situations. Such test cases are executed with negative test data. For a negative test case, there can often be different types of negative test data. So, the same negative test case can be run with different combinations of negative test data to ensure that the software application works correctly for all combinations of negative test data.

Test data can be divided into two classes i.e., positive test data and negative test data. Positive test data is used to test and validate the normal outcome of a function of the software application. Negative test data can be used to test the unexpected, uncommon, or any form of invalid input conditions. This is data that is generally considered "invalid" with respect to the correct functional working of the code. Negative test data can be further classified into null data, erroneous data, boundary conditions data. The null data involves providing no data when the software application expects that data. Erroneous data involves providing data so that it allows testers to determine the behavior of the software application when data is in an incorrect format. An example of this is to provide a negative number as an input to a system that only expects positive numbers. Boundary conditions data involves providing test data to determine the behavior of the software application which can potentially cause the application to get into an error state. Test data chosen in this case is the extreme end of the values that the software application expects. An example of this is to give a very long text of more than 500 characters as an input to a system that only expects text of 250 characters or less. The disclosed system can use machine learning models to create test data. Moreover, updated test data can be generated after any changes in the software application. The disclosed system may also apply machine learning techniques to the problem of identifying GUI objects and controls on the screen for GUI automation programming tools to manipulate them.

Any new feature in a software application or modification to an existing feature, or development of a new software product starts with the product specification documents. These documents include details like how the software will look and function. Such documents can include text, user interface, wireframes, or mockups to show features and functions of the software. The documents may also include various acceptable and unacceptable functions and features of the product.

A software application being developed can undergo validation testing to find out and eliminate errors before the product is released. The disclosed system can provide for automated validation testing of software applications and can include machine learning-based authoring of test cases and test steps using the product specification documents, and further generating test data. The system can track the changes in the product specification documents and accordingly update the test cases and test data with minimal or no manual intervention.

Figure 2A:
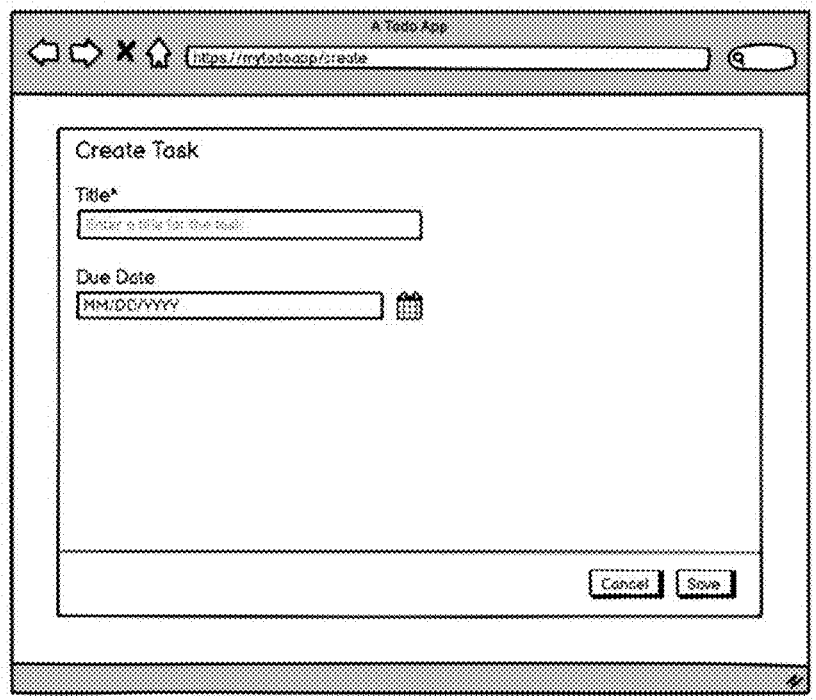
FIG. 2a shows an example user interface (UI) specification from a product specification document of the software application that can be processed by the disclosed system for generating test cases and test data, according to an exemplary embodiment of the present invention.
Figure 2B:
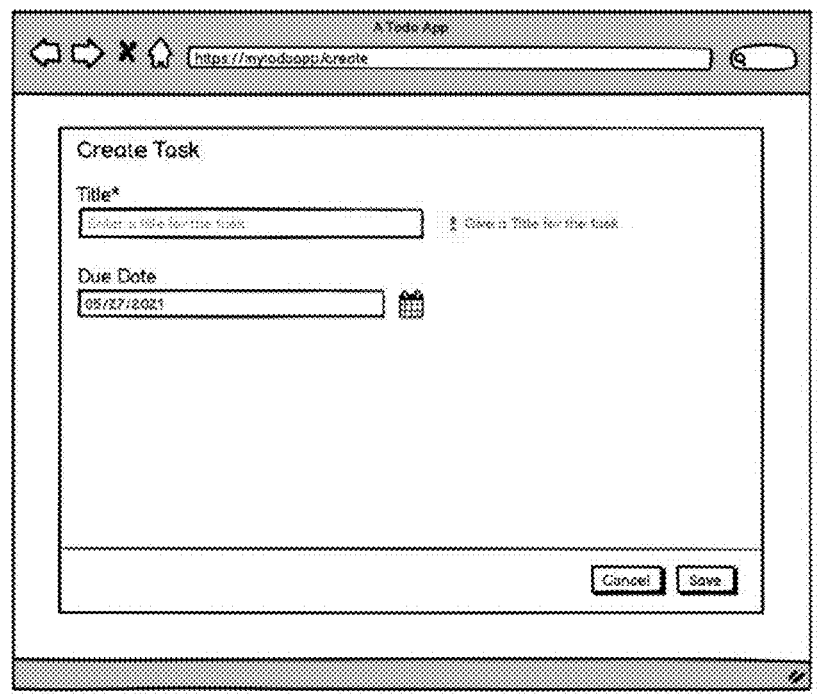
FIG. 2b shows another example of UI specification from a product specification document that can be processed by the disclosed system for generating test cases and test data, according to an exemplary embodiment of the present invention.
Figure 2C:
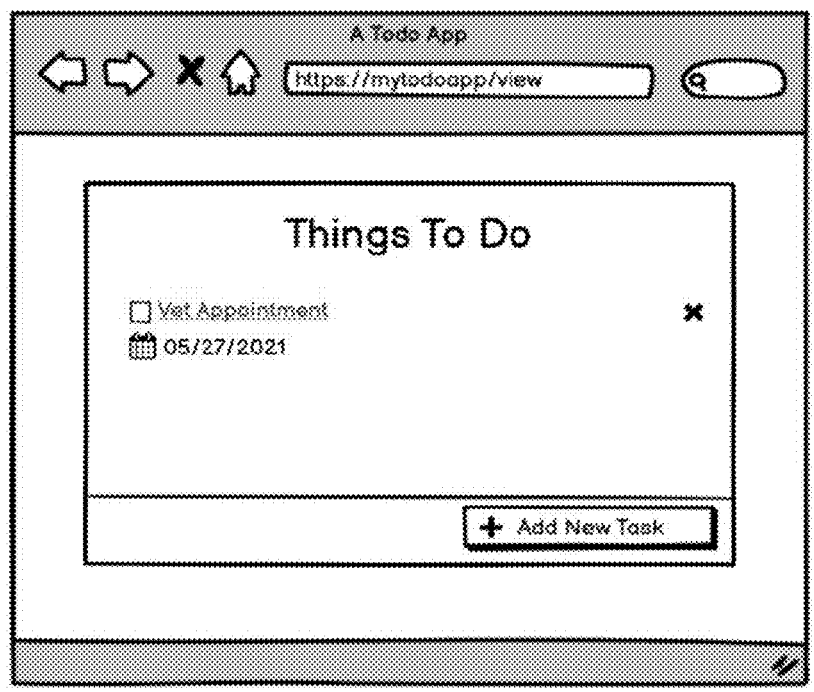
FIG. 2c shows another example UI specification from a product specification document of a software application that can be processed by the disclosed system for generating test cases and test data, according to an exemplary embodiment of the present invention.

The disclosed system can analyze the product specifications using machine learning models and image recognition algorithms. Typically, a specification may include a list of feature specifications and user interface specifications for one or more feature specifications. FIG. 1 shows an example of feature specification that may be used to generate test cases by the disclosed system. The feature specification can be text that includes the intended functionality, capabilities, and how the end-user is expected to interact with the product and its features. Referring to FIGS. 2a, 2b, and 2c which shows examples of User Interface (UI) Specifications that are visual representations of the product for the software development team to build the described product. User Interface (UI) Specifications are mostly collections of images, sketches, wireframes, or screen mockups that identify the various User Interface elements of the product to be built. The UI specifications can also be used to generate test scenarios for validating a product. Wireframes are blueprints that represent the overall layout and fields on the screen. Wireframes are early screen concept or a low fidelity way of showing designs. A typical wireframe lays out the basic shapes and elements including the position of each component of a screen and an overall functional and design sense. Wireframes provide a quick way to visualize data and fields that will be included on a single user interface screen. Wireframes can be made using a variety of tools like UXpin, Balsamiq, and Sketch. Mockups are high-fidelity renderings that provide visual details like colors and typography in addition to screen layout and fields on the screen. Both wireframes and mockups visually represent a design of a single user interface screen. Hereinafter, the words "mockups" and "wireframes" are interchangeably used.

FIG. 2a shows a mockup of creating a task list that requires a mandatory entry of "title" and optional due date. Click buttons can also be seen. FIG. 2b shows a mockup that presents an error for not providing a title. FIG. 2c shows a mockup for displaying the list of tasks and a clickable button to add a new task. The disclosed system can analyze such UI specifications from the product specification to generate test cases along with test steps. Also, the system can receive test steps for validating the product and its features. Typically, QA team documents specific test cases and test steps to validate the software product.

Figures 3, 3A:
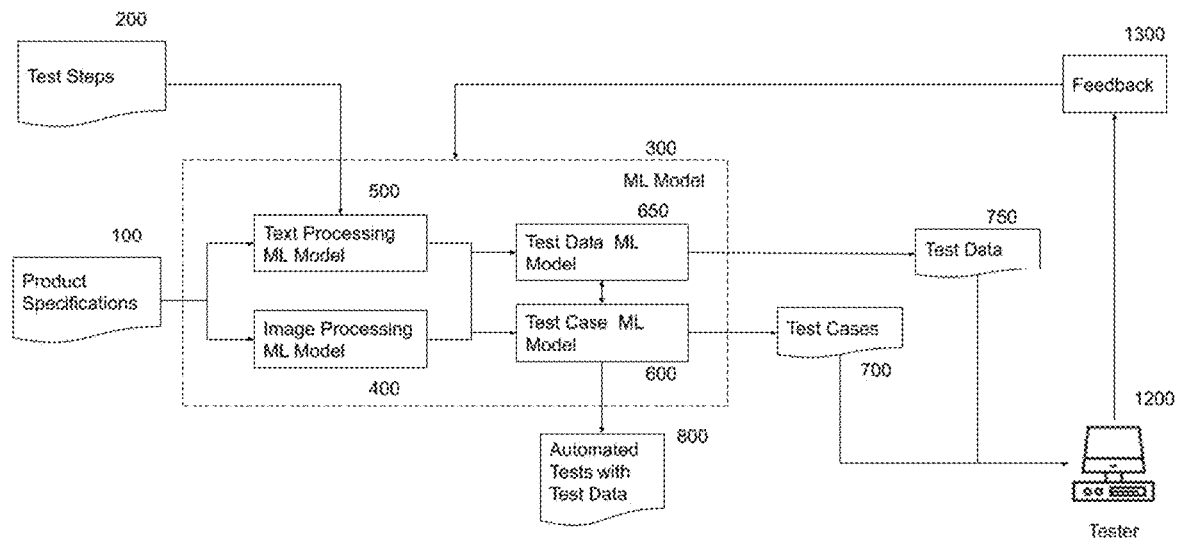
FIG. 3 is a block diagram showing the mechanism for generating test cases and automated test procedures with test data from the product specification document, according to an exemplary embodiment of the present invention.
FIG. 3a shows an exemplary embodiment of the test steps 200 in FIG. 3, according to an exemplary embodiment of the present invention.

Referring to FIG. 3 which is a block diagram showing steps of generating the test data 750 and test cases 700. The disclosed system and more particularly, a novel machine learning ML Model 300 can receive product specification documents 100 of a software application. The ML Model 300 may include text processing ML model 500 and image processing ML model 400. The text processing ML model 500 can process the feature specifications from the product specification documents 100. The image processing ML model 400 can process the UI specifications from the product specification documents 100. The text processing ML model 500 can also receive test steps 200. An example of test steps for "cancel" button behavior is shown in FIG. 3a. Tester 1200 can provide product specification documents 100 and optionally also provide the test steps 200 as input documents to the system. The ML Model 300 can process the text and images to produce Test Cases 700, Test Data 750, and Automated Test procedure. Automated Tests with Test Data 800 is the test code in the framework and programming language of the user's choice. Test Cases 700 and Test Data 750 can be in human-readable form and allows Tester 1200 to review and provide feedback to the system. The corrected test case and test data information is provided back to the ML Model 300 for future reference and training the ML Model 300 for better results going forward.

The ML Model 300 can include four different machine learning models each handling and solving specific needs. It includes the Image Processing ML Model 400, Text Processing ML Model 500, Test Case ML Model 600, and Test Data ML Model 650.

The Image Processing ML Model 400 is a pre-trained model capable of identifying various UI elements, and their attributes like, but not limited to, their position on the screen, relative positions between different GUI elements, the associated text labels, and common validation markers. For example, a common convention is to use an asterisk (*) in the label of the input text to highlight the text as mandatory to the end-user. Such validation markers can be identified by Image Processing ML Model 400 and recorded. The Image Processing ML Model 400 may use image processing to segment the mockup image into smaller blocks and then apply the machine learning classifiers to identify the GUI elements (a text, an input box, checkbox, etc.), associated text labels, and common validation markers. The machine learning classifiers may utilize image classification algorithms like Convolutional Neural Network (CNN), R-CNN, Fast R-CNN, Faster R-CNN, YOLO, and variations of these existing algorithms.

FIG. 3b shows an example of data that may be generated by Image Processing ML Model 400 for the UI Specification shown in FIG. 2a.

Text Processing ML Model 500 is a pre-trained model that parses the text of the functional specifications from the product specification documents 100 as well as any optionally provided test steps 200 and extracts all the relevant contextual information from them. This includes extracting entities, acceptable and unacceptable use cases, various user interactions, outcomes from these interactions, and screen navigation information. Text Processing ML Model 500 relies on techniques like NLP (Natural Language Processing), NER (Named Entity Recognition), and NLU (Natural Language Understanding) for extracting this information and translating it into a form that can be processed by the Test Case ML Model 600. FIG. 3c shows an example of data that may be generated by Text Processing ML Model 500 for the feature specification shown in FIG. 1.

The Test Case ML Model 600 is a pre-trained model that accepts the generated data from Image Processing ML Model 400 and Text Processing ML Model 500 to build all the various possible test cases and the automated test steps needed to execute each test case. Each step in a test case is an action that manipulates the GUI objects while validating and asserting the values and behaviors seen on the GUI.

Test Data ML Model 650 is a pre-trained model that accepts the generated output from Image Processing ML Model 400 and Text Processing ML Model 500 to build all the various possible test data combinations necessary for test steps to work. Once an entity and its attributes are identified from the Product Specifications and Test Steps document, the Test Data ML Model 650 can generate test data for each entity attribute. For effective testing of all the scenarios the generated test data contains both positive and negative sets of data. Each test case is also accompanied by a set of test data to validate the behavior of the software application.

Another improvement that the Test Data ML Model 650 brings to the process is the ability to generate test data that is realistic and accurate in the context of real-life objects and scenarios. Using realistic data ensures that the software application is tested in a condition that is closer to how a real user would use the software application. The ML models can utilize Named Entity Recognition (NER) to identify objects and their possible values such that it mimics the real-world. For example, the system can be trained to identify that the 'age' of a user will always be a positive number and in the real world, it will be less than 120 years. Similarly, the system can be trained to understand what a "task" means by providing training data to produce more realistic results.

FIG. 3d shows an example of Test Cases 700 which is generated by Test Case ML Model 600. It may consist of more than one positive and negative test case. FIG. 3e shows an example of Test Data 750 that is generated by Test Data ML Model 650. Test Case ML Model 600 can also translate Test Cases 700 along with Test Data 750 into Automated Tests with Test Data 800. FIG. 3g shows an example of source code generated as part of Automated Tests with Test Data 800.

Figure 3F:
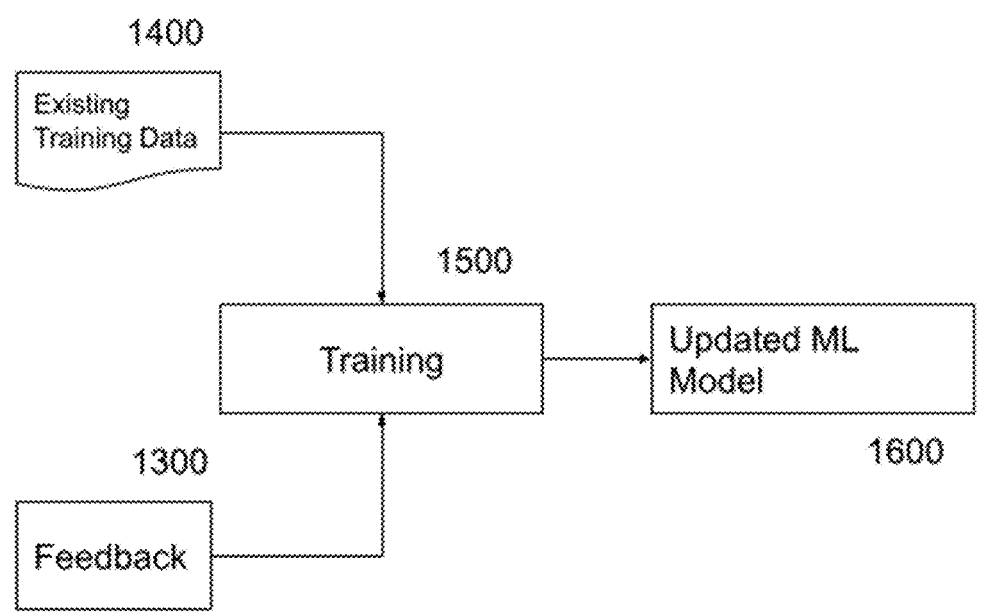
FIG. 3f shows a mechanism of training a machine learning (ML) model, according to an exemplary embodiment of the present invention.

Tester 1200 can review the information in Test Cases 700 and Test Data 750 and make corrections or additions to them. All such edits are recorded by the Feedback 1300 that may be used to retrain the existing models in ML Model 300. FIG. 3f is a block diagram of a mechanism for training an ML model. It receives the existing training data along with the new edits provided by the Tester 1200 through Feedback 1300 and can generate the updated ML Model 1600.

It is sometimes possible that Product Specification documents might not cover all acceptable and unacceptable use cases, various user interactions, outcomes from these interactions, and screen navigation information. In such a scenario, it is up to the QA Teams to add additional test cases to the automated tests. To allow such changes and add new use-cases to the Automated Tests with Test Data 800, the system allows specifying these use-cases using natural language by providing Test Steps 200. The Test Steps 200 go through the same set of steps and the system generates Test Cases with Test Data and Automated Tests for these test steps 200 along with those generated from the Product Specifications. FIG. 3a is an example of how Test Steps can be provided to the system.

Figure 4:
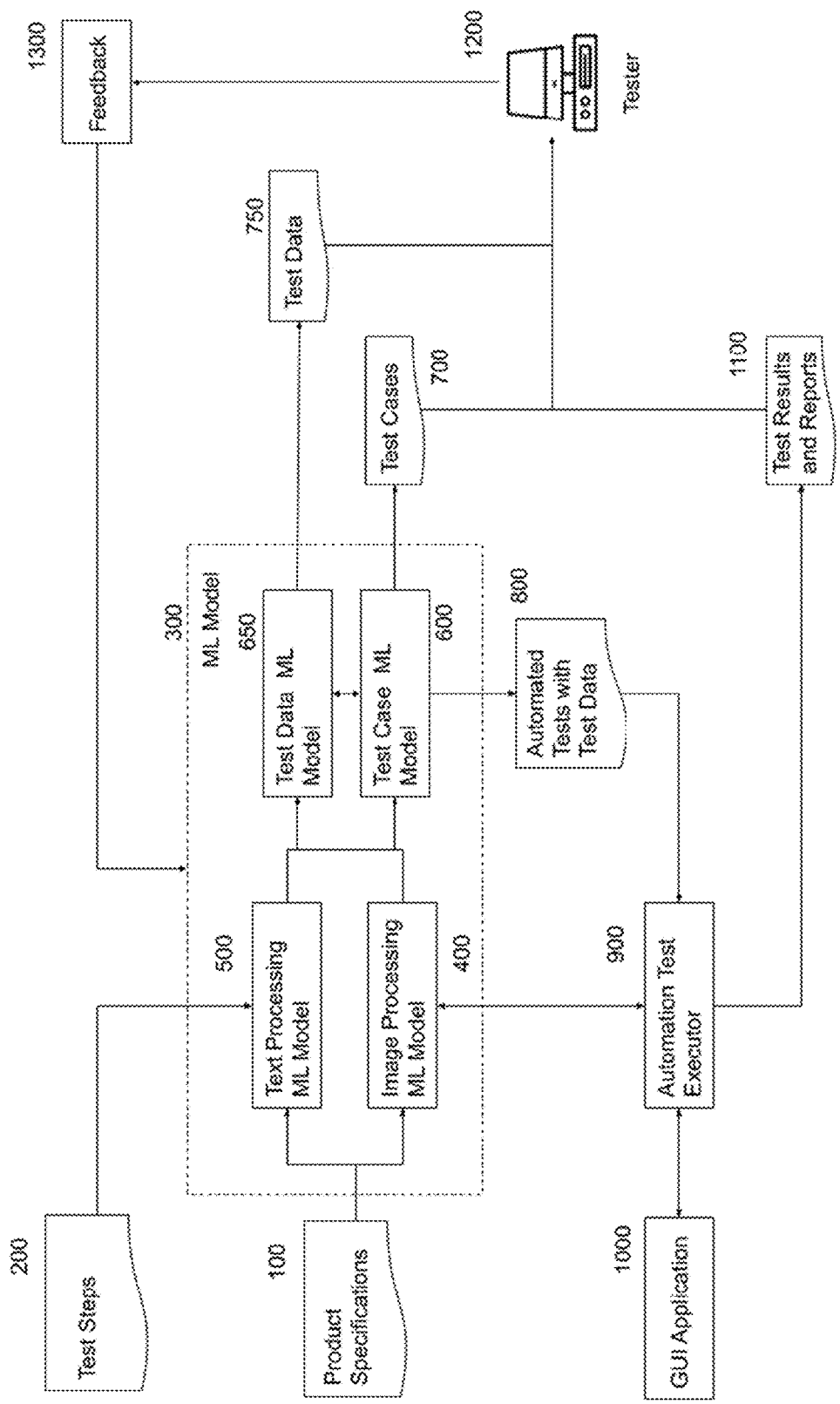
FIG. 4 shows a block diagram of a mechanism for generating test cases with data, automated tests, and execution of automated tests from the product specification document, according to an exemplary embodiment of the present invention.

FIG. 4 is a block diagram of a mechanism for executing the generated automated tests with test data from the Product Specification document. In this particular case, the software application or the software feature to be tested is available for testing and the system runs the automated tests to track the completion of various features of the software application, validate the quality of the software application, performance, and its readiness to ship to the customers.

In this, the Automation Test Executor 900 uses the generated Automated Tests with Test Data 800 to run the tests and validate the software GUI Application 1000. The automated testing process involves navigating through the software GUI Application 1000 being tested using the GUI by clicking on buttons, checking checkboxes, typing text into input boxes, etc., and validating and asserting the values and behaviors seen on the GUI. To do this the Automation Test Executor 900 must identify the GUI controls on the screen in order to manipulate them.

Most GUI automation tools identify these GUI controls (buttons, checkboxes, input box, etc.) by certain properties of the object. These properties used for identifying the elements could be their class, their text, the order in which they appear, and their locations relative to parent objects. When these properties change, the automation will break and give false-negative results.

Figure 4A:
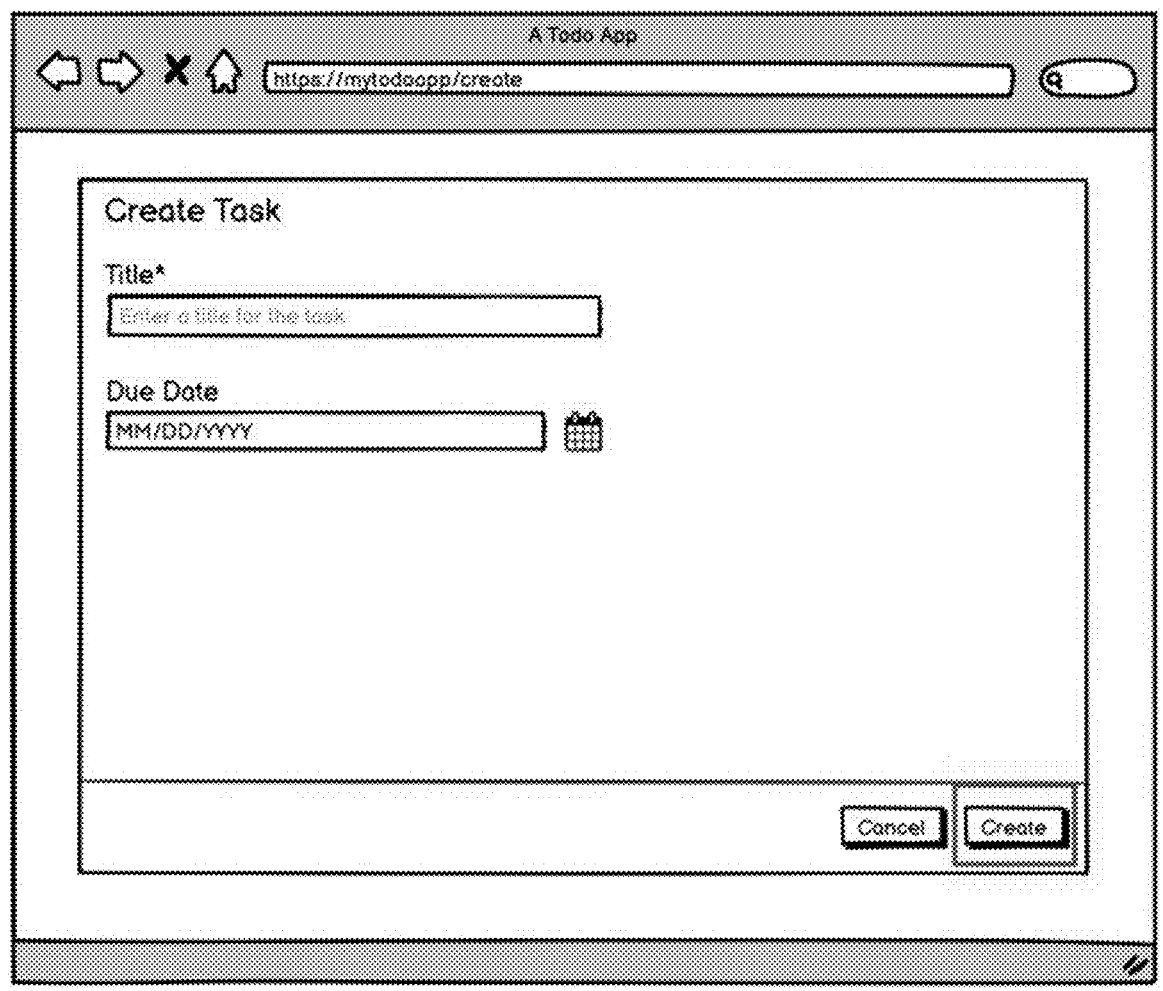
FIG. 4a shows the example UI specification of FIG. 2a with a modification shown by highlighted outline.
Figure 4C:
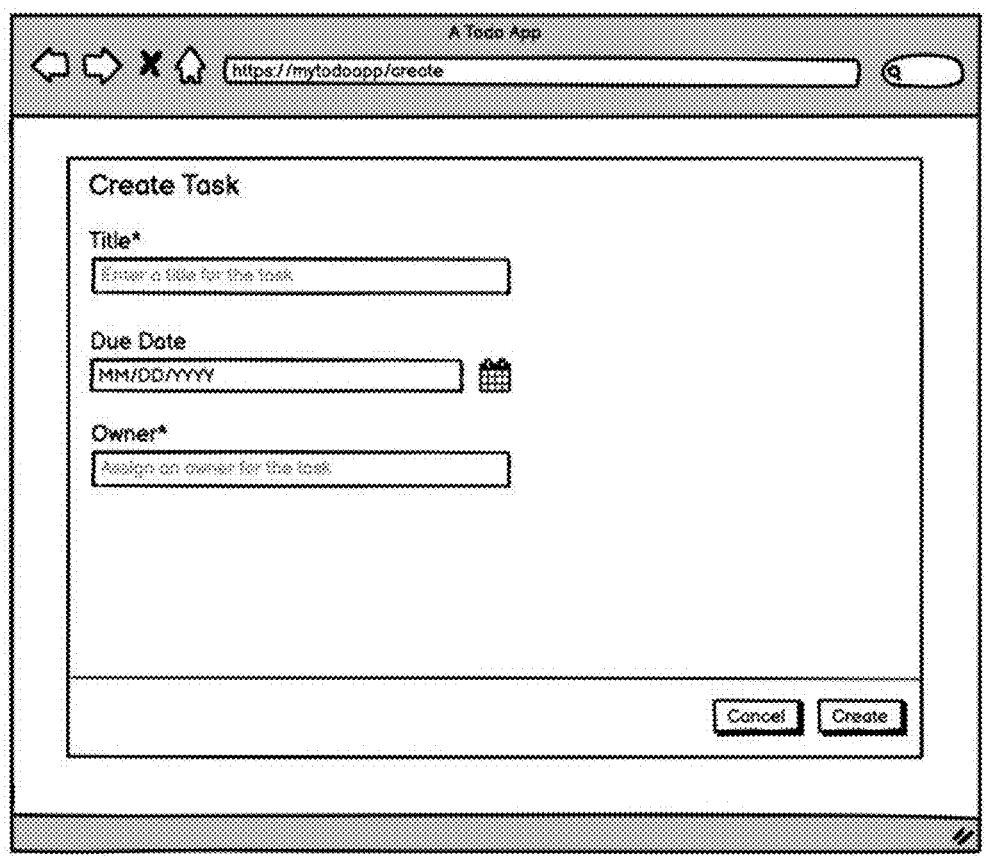
FIG. 4c shows the example UI specification of FIG. 2a with an added feature.

FIG. 4a illustrates a change in mockup where the button text is changed from 'Save' (FIG. 2a) to 'Create' (FIG. 4a). With even a small change like a text change, prior art GUI automation tools may fail to identify the button and require updated test automation scripts to reflect the changes. FIG. 4b illustrates a change in functional specification highlighting the addition of another attribute—"Owner" for the entity "Task". For this same enhancement, FIG. 4c illustrates a change in the mockup with the new input box for the owner of the task which is a mandatory text for this screen. With even a small change like a new mandatory GUI element on the screen, prior art manual and automated tests may fail to verify the functionality correctly.

The change mentioned in FIGS. 4a, 4b, and 4c when documented in the Product Specification may trigger the disclosed system to regenerate automation tests and test data and then these can validate the functionalities and features in software GUI Application 1000 (FIG. 4) without any failures.

FIG. 4d shows an example of updated test data that may be generated by Test Data ML Model 650 and FIG. 4e shows an example of an updated test case generated by Test Case ML Model 600 once product specification is updated.

Prior art automation tools generally identify a GUI object by the properties of a GUI object. This prior art method of identifying is not reliable since the properties of the GUI object can change with modifications in the software itself. The disclosed Image Processing ML Model 400 provides more reliable identification of GUI objects. When Automation Test Executor 900 runs the Automated Tests with Test Data 800 against the software GUI Application 1000 and is unable to reliably identify the GUI object to manipulate, Image Processing ML Model 400 can help identify that GUI object. Automation Test Executor 900 can take a screenshot image of the software GUI Application 1000 and provide it to Image Processing ML Model 400 for analysis. Image Processing ML Model 400 can compare the screenshot with the screen mockups provided by product specification documents 100 and identify the exact GUI object that needs to be manipulated by the automated test.

Figure 5:
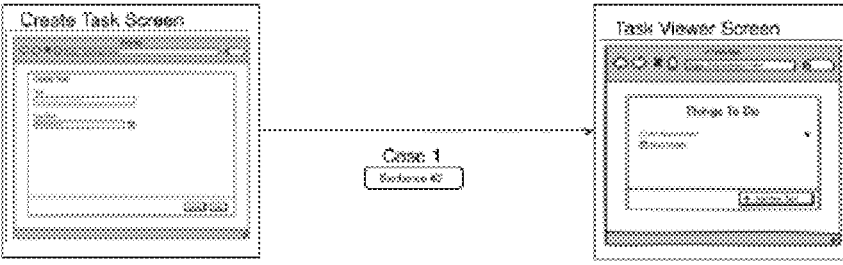
FIG. 5 shows an example of Test Results and Reports 1100, according to an exemplary embodiment of the present invention.

Automation Test Executor 900 can finally generate a report with the final status for the execution of all the automated tests in Test Results and Reports 1100. It may also include documenting the test procedures along with the test results. It can clearly map the requirements specified in the Product Specification documents to the log of the test procedures and test results. This gives the Tester 1200 a simpler mechanism to track the completion of various features of the software application, validate the quality and performance of the software application, document test procedures, and test results, and ensure the readiness of the software application to ship to the customers. FIG. 5 illustrates an example of what Test Results and Reports 1100 may contain.

Figure 6:
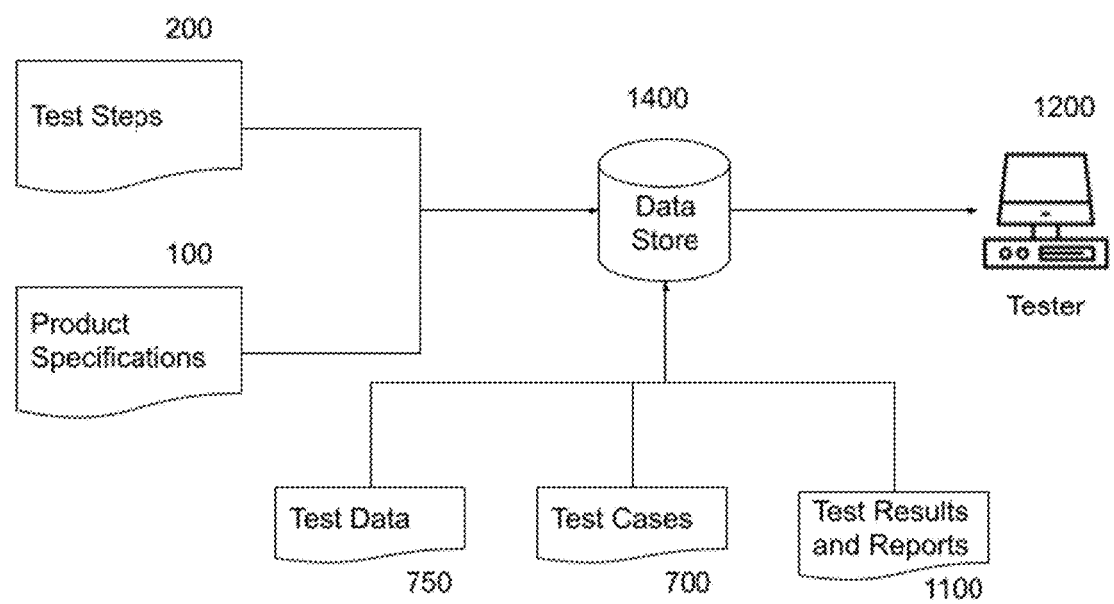
FIG. 6 is a block diagram showing test steps, test cases, test data, test results for each version of the product specification.

FIG. 6 illustrates how the disclosed system can track various features, changes to those features over time, and corresponding test cases, test data, test steps, and test results for each version of the software product. This stored information may be used to view the progression of the quality of the product with every change, may help to triage version-specific issues and execute automation tests specific to that version, and other similar uses. Data Store 1400 can be a database, disk, or cloud storage device which allows storing and retrieving the relevant data. The information stored in Data Store 1400 can be made available to Tester 1200 (or any user of the system) using a web, mobile, or any other interface.

It is to be understood that the presented mechanism, with Test Data 750, provides the ability to generate test data for every change in the system, can be used to generate test data on-demand for manual and automated testing, provides optimal coverage for the test by generating positive and negative data, and assigns data to specific tests based on what is specified in the product specification and test steps document. Additionally, this also makes it possible to generate large volumes of data, which is needed for performance or stress testing of the application after every change.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A computer implemented method for generating test cases and test data for validation testing of a software application during development and post development, the computer implemented method comprises the steps of:
generating and training an image processing machine learning model for processing user interface specifications from one or more product specification documents,
wherein the image processing machine learning model comprises image processing algorithms configured to segment an image into blocks, and machine learning classifiers to classify the blocks into user interface elements, text labels, and validation markers,
wherein the user interface specifications comprise images, wireframes, and mockups, wherein the image processing machine learning model is trained to identify the user interface elements and their attributes, the attributes comprising positions of the user interface elements on a screen, and relative positions between the user interface elements, the text labels, and the validation markers;
generating and training a text processing machine learning model for processing feature specifications from the one or more product specification documents, the text processing machine learning model is configured to extract contextual information from the one or more product specification documents;
processing the one or more product specification documents by the image processing machine learning model and the text processing machine learning model to obtain processed data;
generating and training a test cases machine learning model for generating test cases from the processed data;
generating and training a test data machine learning model for generating test data; and
generating automated test procedures from the test cases and the test data, wherein the automated test procedures are configured for validation testing of the software application during development and post-development, wherein the validation testing comprises:
navigating software application through a graphical user interface (GUI) of the software application, clicking on buttons,
typing text into input boxes, and
validating and asserting values and behaviors seen on the GUI.

2. The computer implemented method according to claim 1, wherein the computer implemented method further comprises the steps of:
tracking one or more changes in the one or more product specification documents;
updating the test cases and the test data based on the changes; and
updating the automated test procedures based on the updated test cases and the updated test data.

3. The computer implemented method according to claim 2, wherein the computer implemented method further comprises the steps of:
executing the automated test procedures;
upon execution, recording steps of the execution of the automated test procedures and outputs of each step of the execution; and
preparing a quality assurance compliant report based on the steps of execution and the outputs, wherein the quality assurance compliant report comprises the validation or errors in the validation, where a quality assurance compliant report is linked to parts of the one or more product specification documents related to the automated test procedures.

4. The computer implemented method according to claim 3, wherein the computer implemented method further comprises the steps of:
storing each change of the one or more changes with the respective test cases, test data, and test results.

5. The computer implemented method according to claim 3, wherein the computer implemented method further comprises the steps of:
capturing snapshots of one or more GUI application screens presented upon execution of the software application;
executing the image processing machine learning model to process the snapshots obtaining processed images;
comparing the processed images with the user interface specifications in the one or more product specification documents; and
upon comparison, identifying one or more user interface objects in the processed images or the one or more product specification documents that need to be manipulated by the automated test procedures.

6. The computer implemented method according to claim 1, wherein the test cases comprise positive test cases and negative test cases, the positive test cases configured to validate normal outcome of a function performed by the software application, the negative test cases configured to determine outcome of the software application under invalid input to the software application.

7. The computer implemented method according to claim 6, wherein the test data comprises positive test data for the positive test cases, and negative test data for the negative test cases.

8. The computer implemented method according to claim 1, wherein the contextual information comprises acceptable and unacceptable use cases, user interactions, outcomes from the user interactions, and screen navigation information.

9. The computer implemented method according to claim 1, wherein the image processing machine learning model comprises NLP (Natural Language Processing), NER (Named Entity Recognition), and NLU (Natural Language Understanding) layers.

10. The computer implemented method according to claim 1, wherein the test data machine learning model comprises Named Entity Recognition (NER) layer to identify objects and their possible values.

11. The computer implemented method according to claim 1, wherein the method further comprises:
presenting the test cases and test data in human-readable form;
receiving feedback on the test cases and test data; and
training the test data machine learning model and test cases machine learning model based on the feedback.

12. A system for generating automated test procedures for validation testing of a software application during development and post development, the system comprises a processor and a memory, the memory including a set of instruction which when executed by the processor causes the processor to:
receive one or more product specification documents;
process the one or more product specification documents, by an image processing machine learning model implemented within the system, to obtain user interface specifications data, wherein the user interface specifications data comprise images, wireframes, and mockups, wherein the image processing machine learning model comprises image processing algorithms configured to segment an image into blocks, and machine learning classifiers to classify the blocks into user interface elements, text labels, and validation markers;

process the one or more product specification documents, by a text processing machine learning model implemented within the system, to obtain feature specifications data, the text processing machine learning model is configured to extract contextual information from the one or more product specification documents;

generating test cases, by a test cases machine learning model implemented within the system, from the user interface specifications data and the feature specifications data;

generating test data, by a test data machine learning model implemented within the system, from the user interface specifications data and the feature specifications data; and generating automated test procedures from the test cases and the test data, wherein the automated test procedures upon execution provide for validation testing of the software application during development and post-development, wherein the validation testing comprises:

navigating software application through a graphical user interface (GUI) of the software application, clicking on buttons, typing text into input boxes, and validating and asserting values and behaviors seen on the GUI.

\* \* \* \* \*